(12) United States Patent
Horning et al.

(10) Patent No.: US 7,943,874 B2
(45) Date of Patent: May 17, 2011

(54) GROUND CONTACT SWITCH FOR PERSONAL NAVIGATION SYSTEM

(75) Inventors: Robert D. Horning, Savage, MN (US); Ryan Supino, Loretto, MN (US); Alan B. Touchberry, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 648 days.

(21) Appl. No.: 12/019,363

(22) Filed: Jan. 24, 2008

(65) Prior Publication Data
US 2009/0071805 A1 Mar. 19, 2009

Related U.S. Application Data

(60) Provisional application No. 60/973,301, filed on Sep. 18, 2007.

(51) Int. Cl.
*H01H 3/14* (2006.01)
*H01H 3/02* (2006.01)
*H01H 35/00* (2006.01)

(52) U.S. Cl. .......................... 200/52 R; 2/905
(58) Field of Classification Search ............... 200/52 R, 200/86.5, 61.45 R
See application file for complete search history.

(56) References Cited

U.S. PATENT DOCUMENTS

| | | | | |
|---|---|---|---|---|
| 6,121,869 | A * | 9/2000 | Burgess | 338/99 |
| 6,809,276 | B1 * | 10/2004 | Guzman | 200/61.48 |
| 7,774,098 | B2 * | 8/2010 | Takenaka et al. | 700/245 |
| 2004/0095276 | A1 | 5/2004 | Krumm et al. | |
| 2009/0073045 | A1 | 3/2009 | Supino et al. | |
| 2009/0326795 | A1 * | 12/2009 | Supino et al. | 701/200 |

FOREIGN PATENT DOCUMENTS

| | | |
|---|---|---|
| DE | 10310857 | 9/2004 |
| EP | 1022583 | 7/2000 |
| FR | 2853221 | 10/2004 |
| GB | 2332052 | 6/1999 |
| WO | 03062850 | 7/2003 |

OTHER PUBLICATIONS

Saarinen et al., "Personal Navigation System", Sep. 2004, pp. 212-217, vol. 1, Publisher: IEEE.
Brand et al., "Foot-to-Foot Range Measnurement as an Aid to Personal Navigation", "CIGTF 22nd Guidance Test Symposium", Jun. 23, 2003, pp. 113-121, Publisher: ION 59th Annual Meeting, Published in: Albuquerque, NM US.

* cited by examiner

*Primary Examiner* — Renee Luebke
*Assistant Examiner* — Lheiren Mae Caroc
(74) *Attorney, Agent, or Firm* — Fogg & Powers LLC

(57) ABSTRACT

A ground contact switch system comprises a first object configured to contact a ground surface during a stride, and one or more switches coupled to the first object. An inertial measurement unit can be coupled to the first object. The one or more switches are configured to detect when the first object is at a stationary portion of the stride. The one or more switches can also be configured to send a signal to activate an error correction scheme for the inertial measurement unit.

20 Claims, 5 Drawing Sheets

GROUND CONTACT SWITCH FOR PERSONAL NAVIGATION SYSTEM

This application claims the benefit of priority to U.S. Provisional Patent Application Ser. No. 60/973,301, filed on Sep. 18, 2007, the disclosure of which is incorporated herein by reference.

CROSS-REFERENCE TO RELATED APPLICATIONS

This application is related to copending U.S. application Ser. No. 12/019,368, and entitled "METHOD OF PERSONAL NAVIGATION USING STRIDE VECTORING," the disclosure of which is incorporated herein by reference.

This application is also related to copending U.S. application Ser. No. 12/019,380, and entitled "ULTRASONIC MULTILATERATION SYSTEM FOR STRIDE VECTORING," the disclosure of which is incorporated herein by reference.

BACKGROUND

In a conventional navigation system, an inertial measurement unit (IMU) is used to track the movement of a person, a ground vehicle, or an air vehicle. Additional sensors are typically used in the navigation system to correct for IMU error growth and drift. The zero velocity update (ZUPT) is a commonly used correction technique for IMU error growth and drift in a navigation system for a person. This technique requires knowledge of when one foot of a person is stationary (i.e., at zero velocity). Currently, this is determined by monitoring accelerometers in the IMU at all times, to identify a signature indicating that the velocity is zero.

In using the ZUPT technique, if a foot is known to be stationary, then the IMU can be checked to make sure that it, too, is indicating zero velocity. If it is not, due to error growth or drift, then the IMU can be corrected. While this technique can reduce IMU error growth and makes the navigation system more accurate, additional computational time and power are required, both of which can be extremely limited in a navigation system. Further, while ZUPT algorithms reduce distance errors, they cannot effectively bound heading errors. In order to bound heading errors a compass is often used with the ZUPT, however, compass accuracy still results in limited position performance and is inadequate for long, precise global positioning system (GPS) denied missions.

Accordingly, there is a need for better techniques to correct for IMU error growth that provide information on when a foot is stationary, without expending too much computation time or power.

SUMMARY

The present invention relates to a ground contact switch system that comprises a first object configured to contact a ground surface during a stride, and one or more switches coupled to the first object. An inertial measurement unit can be coupled to the first object. The one or more switches are configured to detect when the first object is at a stationary portion of the stride. The one or more switches can also be configured to send a signal to activate an error correction scheme for the inertial measurement unit.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken as limiting.

The present invention is related to a ground contact switch for use in personal navigation systems. The ground contact switch vastly simplifies determination of zero velocity, thus reducing computational requirements for inertial measurement unit (IMU) error correction. The ground contact switch makes ascertaining of ground contact by the foot deterministic, and simplifies high performance personal navigation systems, which currently must determine foot contact by analysis of acceleration signals.

The ground contact switch can be used in personal navigation systems for both military and civilian applications. For example, one or more ground contact switches can be used in personal navigation systems implemented in footwear for soldiers, first responder personnel (e.g., fire, rescue, police), consumer applications, and the like.

The ground contact switch can also be used in navigation systems for robots that "walk" such as humanoid robots or other multi-leg robots. For example, one or more ground contact switches can be incorporated directly into the structure of a robot foot as part of the navigation system for the robot.

A ground contact switch system according to one embodiment comprises a first object configured to contact the ground during a stride, and one or more switches coupled to the first object. The first object can be a first item of footwear or a robot foot. The one or more switches are configured to detect when the first object is at a stationary portion of the stride. The switches can send a signal to activate an error correction scheme for an IMU when used in a personal navigation system. The ground contact switch system can also include a second object that is paired with the first object, such as a second item of footwear or another robot foot, and one or more switches coupled to the second object. The one or more switches coupled to the second object are configured to detect when the second object is at a stationary portion of the stride.

Figure 1:
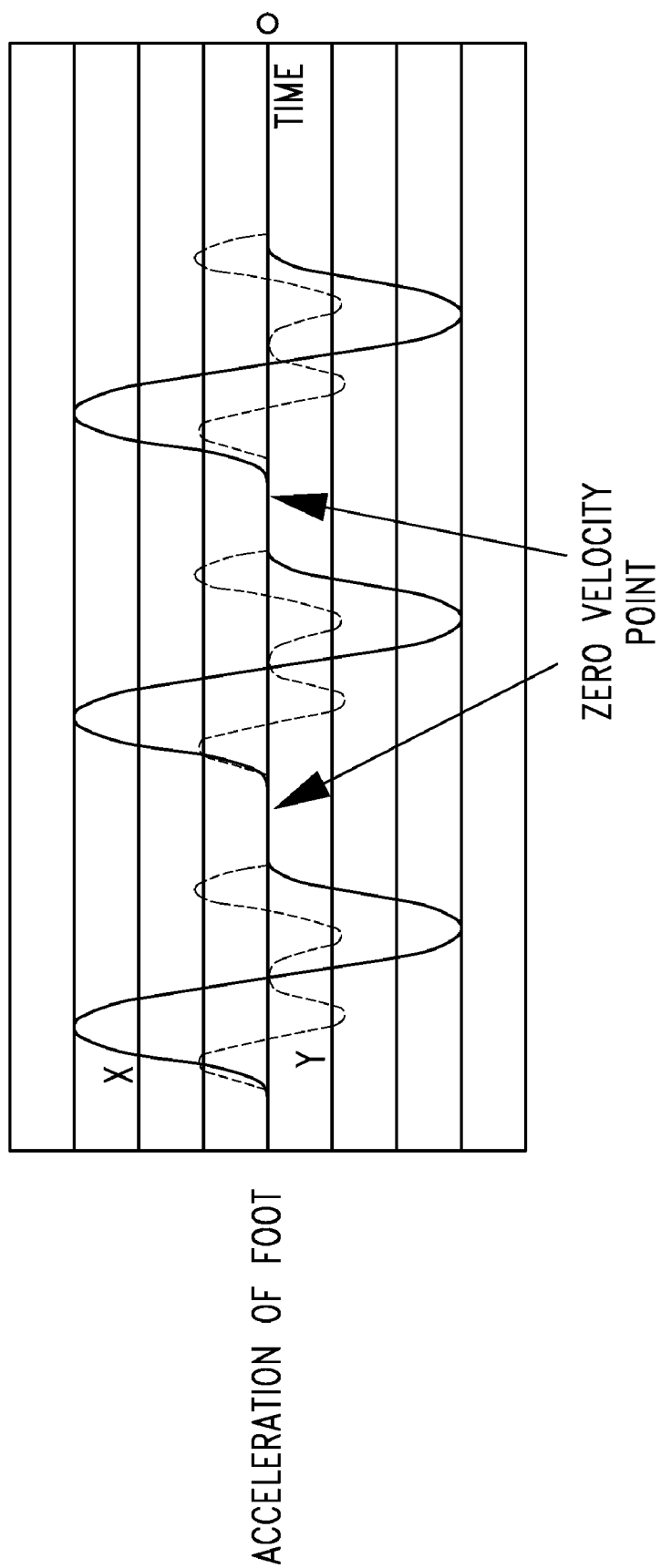
FIG. 1 is a graph showing the acceleration signature of a foot in the x (horizontal) and y (vertical) directions over time.

As described previously, the zero velocity update (ZUPT) is a commonly used correction technique for IMU error growth and drift in a personal navigation system for a person. This technique requires knowledge of when one foot of a person is stationary (i.e., at zero velocity). The zero velocity determination is done by monitoring the IMU accelerometers, or separate accelerometers, at all times, to identify a signature indicating where the velocity is zero. FIG. 1 is a graph showing such a signature in which the acceleration of a foot in the x (horizontal) and y (vertical) directions over time is measured to determine the zero velocity points.

Another IMU error correction technique called "stride vectoring" is described in copending U.S. application Ser. No. 12/019,368, and entitled "METHOD OF PERSONAL NAVIGATION USING STRIDE VECTORING." The stride vectoring technique provides heading information that can be used in non-zero-velocity (motion) IMU error correction. In stride vectoring, while one foot is stationary and the other foot is moving, the position vector between the two can be measured using techniques such as ultrasonic trilateration or multilateration. The IMU in the moving foot can then be updated during the moving portion of the stride (a motion update, or MUPT), and not just the stationary part of the stride. As with the ZUPT, a MUPT requires knowledge of when one foot is stationary.

The present ground contact switches make two significant improvements in applying IMU error correction techniques, which simplify the determination of zero velocity and thereby reduce computational requirements. First, since the foot of a person will have zero velocity only when on the ground, the ground contact switch activates the error correction algorithm (e.g., ZUPT or MUPT) only during ground contact. This eliminates the need to monitor the accelerometers in the IMU at all times, reducing the monitoring to only short time periods. Second, rather than using a ground contact sensor, which provides a continuous signal that must be processed, the present ground contact switch is used, which is only "on" or "off" (contact or no contact). Thus, very little computation is required to make the determination of zero velocity. The switch either turns on the error correction when the person's foot contacts the ground, or the switch turns off the error correction when the foot is off the ground. If necessary, the ground contact switch can trigger a brief check of the accelerometers to verify a zero velocity condition.

The present ground contact switches simplify the identification of a zero velocity condition, and trigger the start of a ZUPT or stride vectoring sequence. This requires far less computation time and power than the typical zero-velocity determination from full-time accelerometer processing.

The ground contact switch can take many forms. For example, the switch can be a pneumatic switch, a resistive switch, a capacitive switch, or the like that is coupled to footwear such as a boot or shoe. One or more switches can be integrated into the footwear, such as one switch at the heel and another switch near the ball of the foot on the sole. Using multiple switches can provide more accuracy in determining the zero-velocity point. Low-cost ground contact switches can be fabricated using polymer sheets and conductive materials.

In an alternative embodiment, the ground contact switch is an ultrasonic switch having a transmitter/receiver (transceiver) embedded in footwear. The transmitted ultrasonic signal reflects off the outer surfaces or inner surfaces of the boot or shoe. The reflection will differ strongly depending on whether the boot or shoe is in contact with solid ground or air, thereby allowing for switching.

The ground contact switch can be implemented in various embodiments. In one embodiment, the switch needs to be flat enough to be coupled to a heel, sole, or insole of a shoe or boot. For example, a switch can be embedded in each boot of a pair of boots. One switch triggers a ZUPT correction, while the other switch triggers the stride vectoring correction. The use of switches rather than sensors dramatically reduces the computational complexity and power usage of determining the zero velocity point.

The switch can be built or set to a certain threshold force setting that represents contact with the ground. For example, a force of about 50 lbs (chosen arbitrarily) or more can be used to trigger the switch for a person weighing 150 lbs. The threshold will vary depending on the weight of the person. A threshold force that is too small would represent uncertain ground contact and would not trigger the switch. The switch can be part of the navigation information algorithm (e.g., Honeywell's ECTOS IIC software) that initiates the error correction (ZUPT or MUPT) algorithm.

Exemplary embodiments of the ground contact switch are described hereafter with respect to the drawings. Although the various ground contact switches described and shown are incorporated into footwear for a person, it should be understood that the ground contact switches can also be incorporated into robotic feet.

Figure 2A:
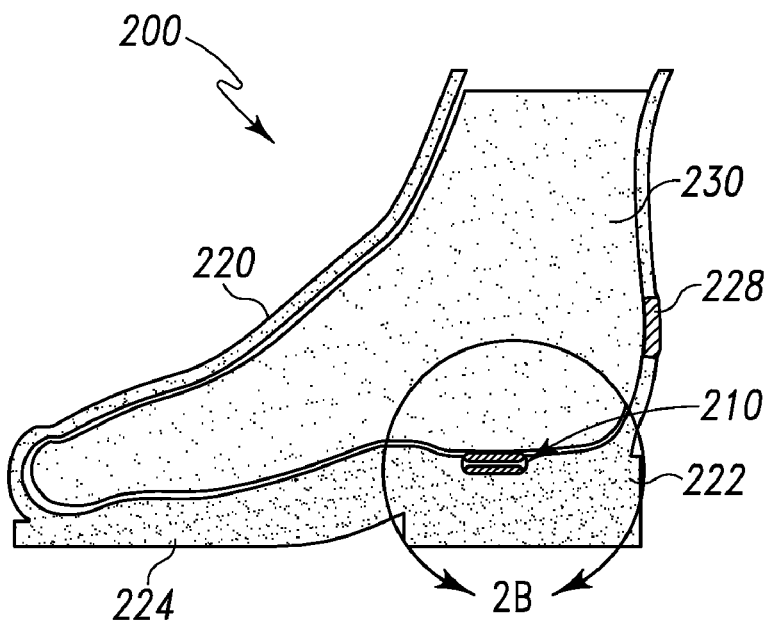
FIG. 2A illustrates one embodiment of a ground contact switch system that includes a pneumatic switch in footwear.
Figure 2B:
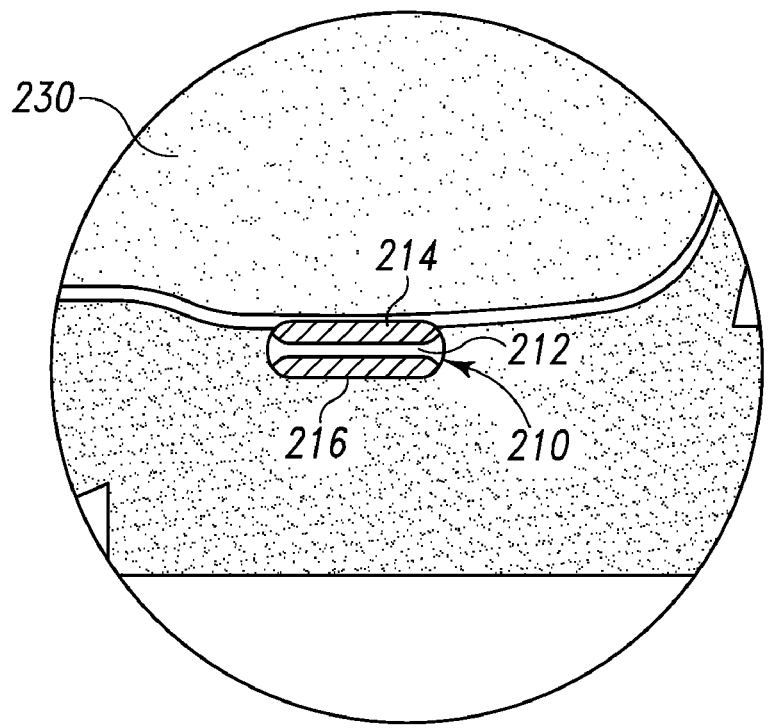
FIG. 2B is an enlarged sectional view of the ground contact switch system of FIG. 2A.

FIGS. 2A and 2B illustrate one embodiment of a ground contact switch system 200 including a first pneumatic switch 210 coupled to a first item of footwear 220, such as a boot or shoe. The footwear 220 has a heel 222 and a sole 224 each with an outer surface that contacts the ground during use. The switch 210 is configured to detect when a foot 230 inside footwear 220 is at a stationary portion of a step.

As depicted in FIG. 2B, pneumatic switch 210 includes a flexible reservoir 212 of gas, such as air or nitrogen, which is attached to footwear 220. The pneumatic switch 210 also includes a pair of switch plates 214, 216 attached to opposite sides of flexible reservoir 212. The switch plates 214, 216 are composed of a conductive material such as aluminum or copper, or layered combinations of metals.

In one embodiment, pneumatic switch 210 can be embedded in heel 222 or sole 224 of footwear 220. In an alternate embodiment, pneumatic switch 210 can be mounted on the outer surface of heel 222 or sole 224 of footwear 220

In one embodiment such as shown in FIG. 2A, an inertial measurement unit (IMU) 228 can be coupled to footwear 220 as part of a personal navigation system. The IMU 228 can be embedded in footwear 220 or attached to an outer surface of footwear 220. The IMU 228 can include micro-electro-mechanical systems (MEMS) gyroscopes and accelerometers that are integrated onto a single, six degree-of-freedom (DOF) chip.

The ground contact switch system 200 can further include a second item of footwear that is paired with the first item of footwear 220, such as a pair of boots or shoes. A switch can be coupled to the second item of footwear similar to switch 210 in the first item of footwear 220. The second switch is configured to detect when a foot inside the second item of footwear is at a stationary portion of a step. The second item of footwear can have an IMU such as IMU 228 embedded therein, or can exclude the IMU.

During use, pneumatic switch 210 detects that foot 230 inside footwear 220 is at a stationary portion of a step when flexible reservoir 212 is compressed by foot 230 sufficiently to cause switch plates 214, 216 to contact each other and activate a signal. The signal can initiate an error correction scheme for a personal navigation system, such as error compensation using stride vectoring for IMU 228. The pneumatic switch 210 turns on the error correction when foot 230 contacts the ground with sufficient force such as during a stride.

The pneumatic switch 210 turns off the error correction when foot 230 is off the ground during the stride.

Figure 3A:
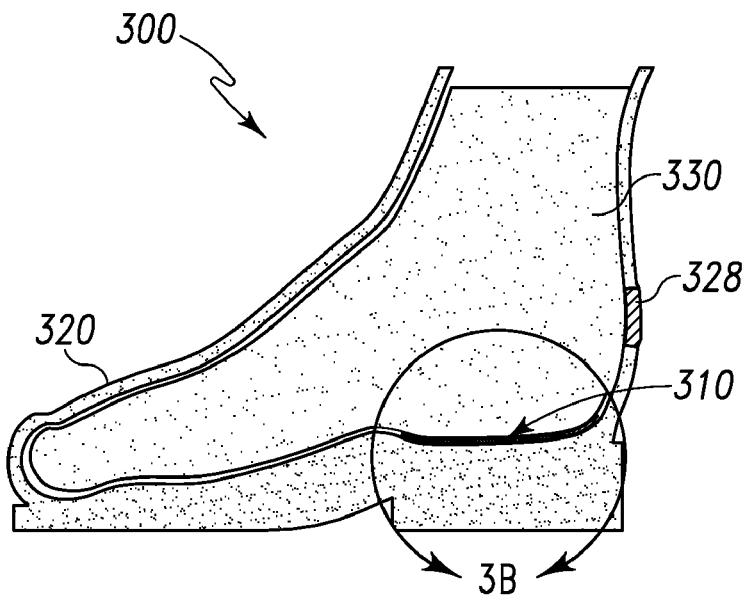
FIG. 3A illustrates another embodiment of a ground contact switch system that includes an electrical switch in footwear.
Figure 3B:
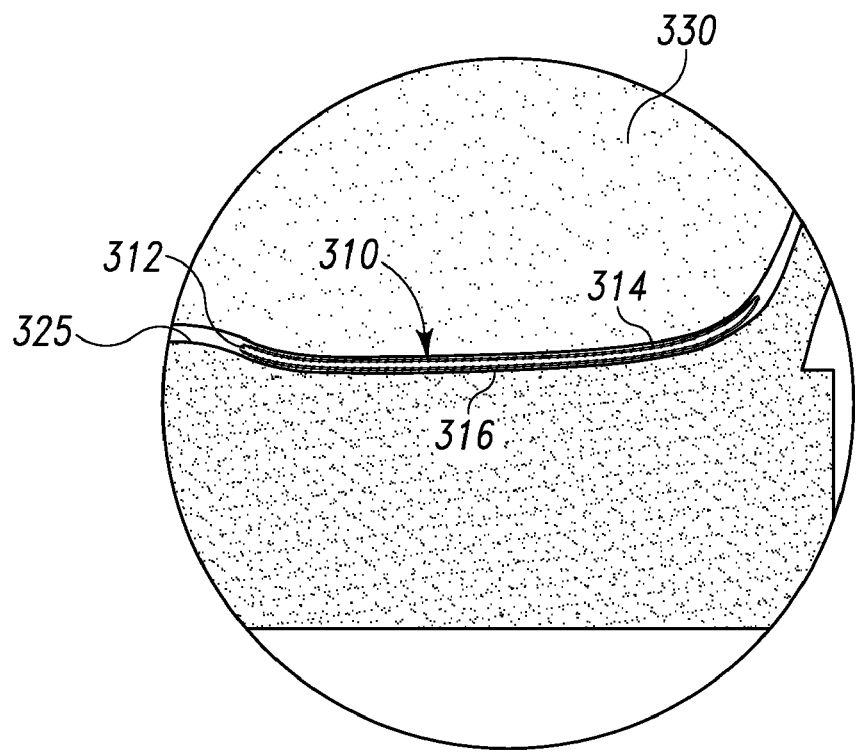
FIG. 3B is an enlarged sectional view of the ground contact switch system of FIG. 3A.

FIGS. 3A and 3B illustrate another embodiment of a ground contact switch system 300 including an electrical switch 310 coupled to a first item of footwear 320, such as a boot or shoe. The switch 310 is configured to detect when a foot 330 inside footwear 320 is at a stationary portion of a step.

As shown in FIG. 3B, electrical switch 310 includes a thin elastic layer 312 of a resistive material or a dielectric material, which is interposed between at least two conductive layers 314 and 316 in a stacked configuration. The conductive layers 314 and 316 can be formed of various metallic materials, such as aluminum, gold, platinum, copper, or combinations thereof.

When an elastic resistive material is used for layer 312, the electrical switch 310 is a resistive switch. Various types of elastic resistive materials can be used for layer 312. In some resistive materials, the resistance changes due to the thickness change (compression) of layer 312 when foot 330 steps on switch 310. In other resistive materials, the resistance changes as embedded conductive particles get closer together under compression.

When an elastic dielectric material is used for layer 312, the electrical switch 310 is a capacitive switch. Various types of elastic dielectric materials can be used for layer 312, such as various kinds of rubber (e.g., latex, silicone, neoprene, etc.) that can be formed into thin layers. The capacitance changes due to the thickness change (compression) of layer 312 when foot 330 steps on electrical switch 310.

In one embodiment, electrical switch 310 can be attached to an insole 325 of footwear 320. In an alternate embodiment, electrical switch 310 can be mounted on the outer (bottom) surface of the heel or sole of footwear 320. In other embodiments, multiple electrical switches (two or more) can be attached or mounted to the heel or sole of footwear 320.

In one embodiment such as shown in FIG. 3A, an IMU 328 can be coupled to footwear 320 as part of a personal navigation system. The IMU 328 can be embedded in footwear 320 or attached to an outer surface of footwear 220. The IMU 328 can include the same features as discussed above for IMU 228.

The ground contact switch system 300 can further include a second item of footwear that is paired with the first item of footwear 320, such as a pair of boots or shoes. A switch can be coupled to the second item of footwear similar to switch 310 in the first item of footwear 320. The second switch is configured to detect when a foot inside the second item of footwear is at a stationary portion of a step. The second item of footwear can have an IMU such as IMU 328 embedded therein, or can exclude the IMU.

During use, electrical switch 310 detects that foot 330 inside footwear 320 is at a stationary portion of a step when elastic layer 312 is compressed by foot 330 sufficiently to change the resistance or capacitance of electrical switch 310 to a predetermined threshold level such that electrical switch 310 activates a signal. The signal can initiate an error correction scheme for a personal navigation system, such as error compensation using stride vectoring for IMU 328. The electrical switch 310 turns on the error correction when foot 330 contacts the ground with sufficient force such as during a stride, and turns off the error correction when foot 330 is off the ground during the stride.

Figure 4:
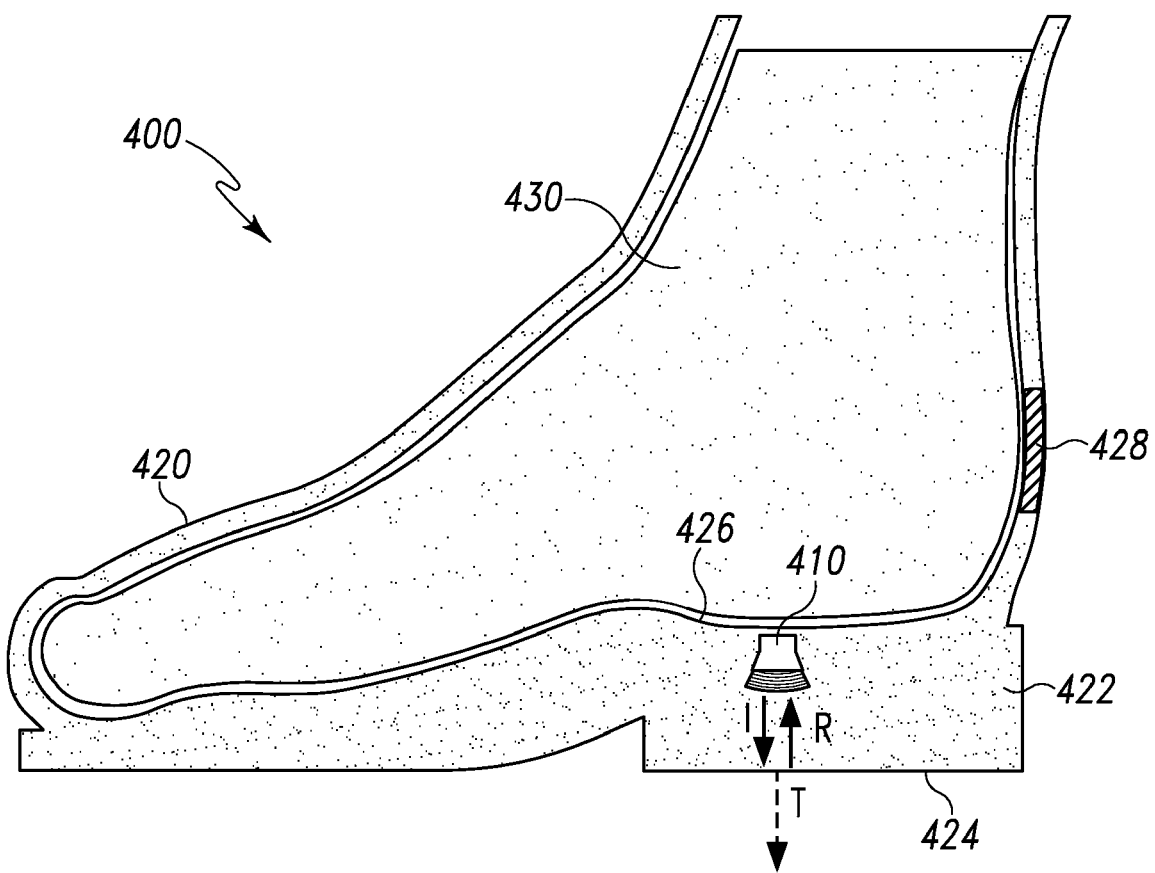
FIG. 4 illustrates another embodiment of a ground contact switch system that includes an ultrasonic switch in footwear.

FIG. 4 illustrates another embodiment of a ground contact switch system 400 that includes an ultrasonic switch 410 coupled to a first item of footwear 420, such as a boot or shoe. The footwear 420 has a heel 422 with an outer surface 424 that contacts the ground during use. The switch 410 is configured to detect when a foot 430 inside footwear 420 is at a stationary portion of a step.

The ultrasonic switch 410 includes an ultrasonic transceiver configured to transmit and receive an ultrasonic pulse. In one embodiment, the ultrasonic transceiver can be configured to outwardly transmit the ultrasonic pulse toward outer surface 424 of heel 422. In an alternate embodiment, the ultrasonic transceiver can be configured to inwardly transmit the ultrasonic pulse toward an insole 426 of footwear 420. In one embodiment, ultrasonic switch 410 can be embedded in heel 422.

When ultrasonic switch 410 is configured to outwardly transmit, an ultrasonic pulse having an incident signal (I) is transmitted toward outer surface 424 of heel 422. A reflected signal portion (R) of signal (I) is reflected back from outer surface 424, and a transmitted signal portion (T) passes through outer surface 424. The intensity of the reflected signal portion will differ depending on whether footwear 420 is in contact with solid ground or air. When ultrasonic switch 410 is configured to inwardly transmit, an ultrasonic pulse is transmitted toward insole 426 of footwear 420. As the pressure between foot 430 and footwear 420 changes during a stride, the reflected signal intensity changes.

In one embodiment, an IMU 428 can be coupled to footwear 420 as part of a personal navigation system. The IMU 428 can be embedded in footwear 420 or attached to an outer surface of footwear 420. The IMU 428 can include the same features as discussed above for IMU 228.

The ground contact switch system 400 can further include a second item of footwear that is paired with the first item of footwear 420, such as a pair of boots or shoes. A switch can be coupled to the second item of footwear similar to switch 410 in the first item of footwear 420. The second switch is configured to detect when a foot inside the second item of footwear is at a stationary portion of a step. The second item of footwear can have an IMU such as IMU 428 embedded therein, or can exclude the IMU.

During use, ultrasonic switch 410 detects that foot 430 inside footwear 420 is at a stationary portion of a step when an ultrasonic pulse emitted by switch 410 has a reflected signal portion that reaches a predetermined reflection threshold. If the reflected signal portion intensity indicates contact of footwear 420 with the ground by reaching the predetermined reflection threshold, a switch-on output is produced that initiates an error correction scheme for a personal navigation system, such as error compensation using stride vectoring for IMU 428. If the reflected signal portion intensity indicates contact with air from lifting footwear 420 off the ground, a switch-off output is produced.

The ground contact switches described herein can be implemented as part of a personal navigation system, such as disclosed in copending U.S. application Ser. No. 12/019,380, and entitled "ULTRASONIC MULTILATERATION SYSTEM FOR STRIDE VECTORING."

Figures 5A, 5B:
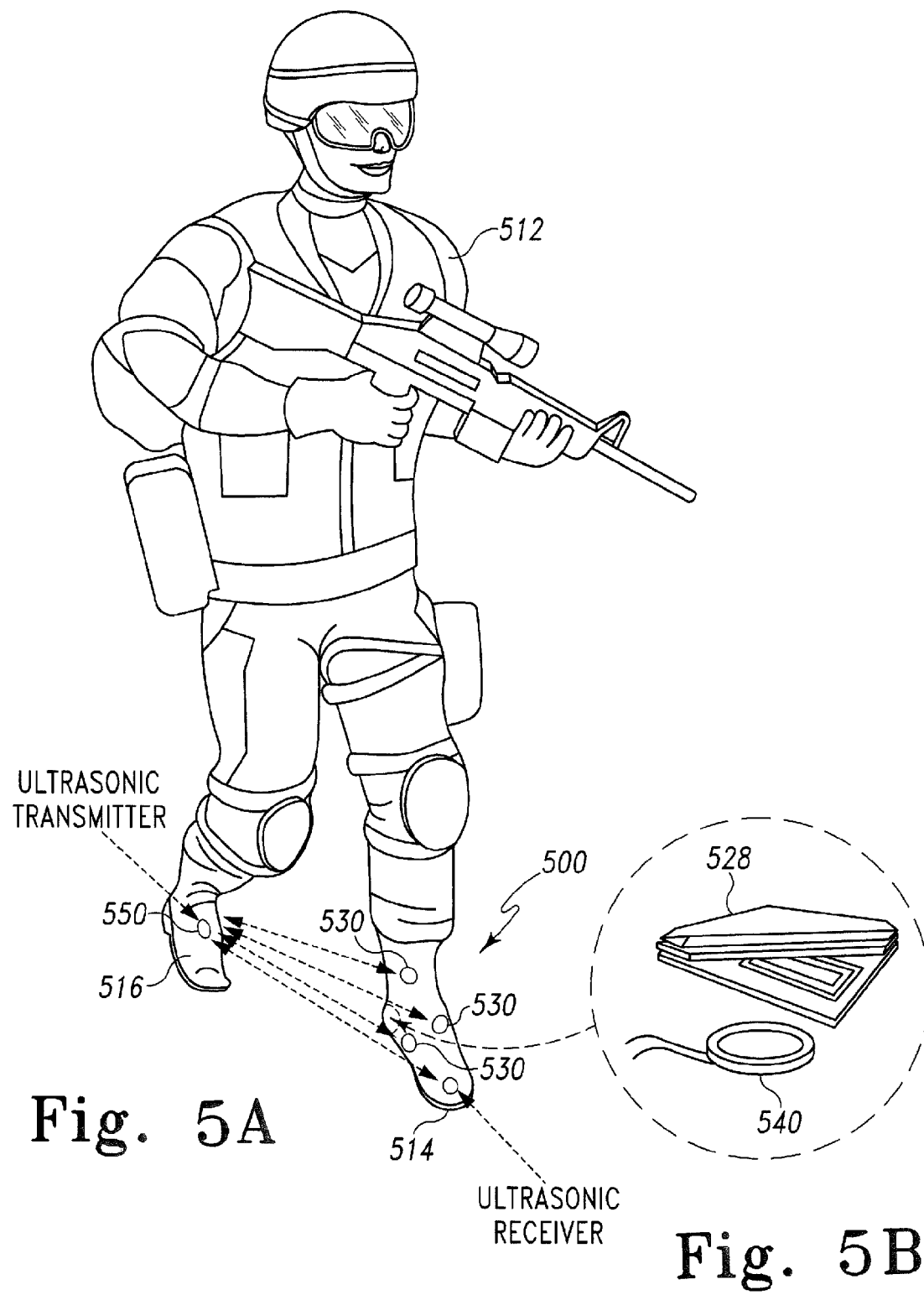
FIGS. 5A and 5B illustrate a personal navigation system in use that implements a ground contact switch system.

FIGS. 5A and 5B illustrate a personal navigation system 500 during use that can implement any of the ground contact switch systems described previously. The personal navigation system 500 generally includes a GPS, an IMU, and other optional features. In one embodiment, the IMU can include MEMS gyroscopes and accelerometers that are integrated onto a single chip, which is copackaged with a processor such as an application-specific integrated circuit (ASIC) to produce the chip-scale ISA. A stride vectoring algorithm, and a ZUPT algorithm can be programmed into the ASIC. Optional features for personal navigation system 500 can include a three-dimensional magnetic compass, barometric altimeter, temperature sensor, motion classification, and a stride vectoring system.

As shown in FIGS. 5A and 5B, a user 512 is wearing a left boot 514 containing an IMU 528, a plurality of non-collinear ultrasonic receivers 530, and a ground contact switch 540. A right boot 516 of user 512 has an ultrasonic transmitter 550 in operative communication with receivers 530, and a ground contact switch (not shown). Although FIG. 5A illustrates that user 512 is a soldier, it should be understood that system 500 can be used by other types of personnel such as first responders, or consumers.

In an alternative embodiment, a navigation system similar to personal navigation system 500 can be incorporated into the feet of a robot that walks. Such a navigation system for the robot generally includes one or more ultrasonic transmitters, ultrasonic receivers, one or more ground contact switches, one or more IMUs, and a GPS.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A ground contact switch system, comprising:
   a first object configured to contact a ground surface during a stride;
   one or more switches coupled to the first object; and
   an inertial measurement unit coupled to the first object;
   wherein the one or more switches is configured to detect when the first object is at a stationary portion of the stride, and send a signal to activate an error correction scheme for the inertial measurement unit.

2. The system of claim 1, further comprising:
   a second object that is paired with the first object; and
   one or more switches coupled to the second object;
   wherein the one or more switches coupled to the second object is configured to detect when the second object is at a stationary portion of the stride.

3. The system of claim 2, further comprising:
   an inertial measurement unit coupled to the second object;
   wherein the one or more switches coupled to the second object is configured to send a signal to activate an error correction scheme for the inertial measurement unit coupled to the second object.

4. The system of claim 2, wherein the first and second objects comprise footwear.

5. The system of claim 4, wherein the footwear comprises a pair of boots or shoes.

6. The system of claim 2, wherein the first and second objects comprise robot feet.

7. The system of claim 2, wherein the switches comprise one or more of a pneumatic switch, an electrical switch, or an ultrasonic switch.

8. A ground contact switch system, comprising:
   a first item of footwear;
   one or more switches coupled to the first item of footwear, the switches comprising one or more of a pneumatic switch, an electrical switch, or an ultrasonic switch; and
   an inertial measurement unit coupled to the first item of footwear;
   wherein the one or more switches is configured to detect when a foot inside the first item of footwear is at a stationary portion of a stride.

9. The system of claim 8,
   wherein the one or more switches is configured to send a signal to activate an error correction scheme for the inertial measurement unit.

10. The system of claim 8, further comprising:
    a second item of footwear that is paired with the first item of footwear; and
    one or more switches coupled to the second item of footwear and comprising one or more of a pneumatic switch, an electrical switch, or an ultrasonic switch;
    wherein the one or more switches coupled to the second item of footwear is configured to detect when a foot inside the second item of footwear is at a stationary portion of the stride.

11. The system of claim 10, further comprising:
    an inertial measurement unit coupled to the second item of footwear;
    wherein the one or more switches coupled to the second item of footwear is configured to send a signal to activate an error correction scheme for the inertial measurement unit.

12. The system of claim 8, wherein the pneumatic switch comprises:
    a flexible reservoir of gas; and
    a pair of conductive switch plates attached to opposite sides of the flexible reservoir.

13. The system of claim 12, wherein the pneumatic switch is embedded in the first item of footwear, or mounted on an outer surface of the first item of footwear.

14. The system of claim 12, wherein the pneumatic switch detects that a foot inside the first item of footwear is at a stationary portion of a stride when the flexible reservoir is compressed by the foot sufficiently to cause the switch plates to contact each other and activate a signal.

15. The system of claim 8, wherein the electrical switch comprises:
    at least two conductive layers in a stacked configuration; and
    an elastic layer of resistive material or dielectric material interposed between the at least two conductive layers.

16. The system of claim 15, wherein the electrical switch is embedded in the first item of footwear, or mounted on an outer surface of a heel or sole of the first item of footwear.

17. The system of claim 16, wherein the electrical switch detects that a foot inside the first item of footwear is at a stationary portion of a stride when the elastic layer is compressed by the foot sufficiently to change the resistance or capacitance of the electrical switch to a predetermined threshold level such that the electrical switch activates a signal.

18. The system of claim 8, wherein the ultrasonic switch comprises an ultrasonic transceiver configured to transmit and receive an ultrasonic pulse.

19. The system of claim 18, wherein the ultrasonic switch detects that a foot inside the first item of footwear is at a stationary portion of a step when the ultrasonic pulse has a reflected signal portion that reaches a predetermined reflection threshold.

20. The system of claim 18, wherein the ultrasonic transceiver is configured to transmit the ultrasonic pulse toward a bottom outer surface of the first item of footwear, or transmit the ultrasonic pulse toward an insole of the first item of footwear.

* * * * *